United States Patent
Primo et al.

(10) Patent No.: US 9,192,532 B2
(45) Date of Patent: Nov. 24, 2015

(54) SEATING APPARATUS FOR CHAIRS

(71) Applicant: ION ARIA LIMITED, Birmingham (GB)

(72) Inventors: Marco Primo, Genoa (IT); Armando Risso, Genoa (IT)

(73) Assignee: Ion Aria Limited, Birmingham (GB)

( * ) Notice: Subject to any disclaimer, the term of this patent is extended or adjusted under 35 U.S.C. 154(b) by 0 days.

(21) Appl. No.: 14/411,626

(22) PCT Filed: Jul. 5, 2013

(86) PCT No.: PCT/EP2013/001986
§ 371 (c)(1),
(2) Date: Dec. 29, 2014

(87) PCT Pub. No.: WO2014/008997
PCT Pub. Date: Jan. 16, 2014

(65) Prior Publication Data
US 2015/0224006 A1    Aug. 13, 2015

(30) Foreign Application Priority Data
Jul. 10, 2012   (IT) .............. GE2012A0068

(51) Int. Cl.
A47C 7/74   (2006.01)
A61G 7/057   (2006.01)
A61G 5/10   (2006.01)

(52) U.S. Cl.
CPC .............. *A61G 7/057* (2013.01); *A47C 7/744* (2013.01); *A61G 5/1043* (2013.01); *A61G 2005/1045* (2013.01); *A61G 2007/05784* (2013.01); *A61G 2203/34* (2013.01); *A61G 2203/46* (2013.01)

(58) Field of Classification Search
USPC .............. 297/180.11, 180.13, 180.14, 180.1, 297/180.12, 180.15
See application file for complete search history.

(56) References Cited

U.S. PATENT DOCUMENTS

| | | | | |
|---|---|---|---|---|
| 3,628,829 | A * | 12/1971 | Heilig ................ | 297/180.14 X |
| 4,729,598 | A * | 3/1988 | Hess ................... | 297/180.14 |
| 4,981,324 | A * | 1/1991 | Law .................... | 297/180.11 |
| 5,160,517 | A * | 11/1992 | Hicks et al. ......... | 297/180.14 X |
| 5,403,065 | A * | 4/1995 | Callerio .............. | 297/180.11 |
| 5,902,014 | A * | 5/1999 | Dinkel et al. ....... | 297/180.14 X |
| 5,921,858 | A * | 7/1999 | Kawai et al. ........ | 297/180.11 X |
| 6,059,018 | A * | 5/2000 | Yoshinori et al. ... | 297/180.14 X |
| 6,657,170 | B2 * | 12/2003 | Clothier ............... | 297/180.11 X |
| 6,929,322 | B2 * | 8/2005 | Aoki et al. .......... | 297/180.14 |
| 7,559,610 | B1 | 7/2009 | Hong Min | |
| 8,272,685 | B2 * | 9/2012 | Lucas et al. ......... | 297/180.14 X |
| 8,827,372 | B2 * | 9/2014 | Yoon ................... | 297/180.13 X |
| 8,888,573 | B2 * | 11/2014 | Bajic et al. .......... | 297/180.11 X |
| 9,027,991 | B2 * | 5/2015 | Ishida et al. ........ | 297/180.14 |
| 2003/0102699 | A1 * | 6/2003 | Aoki et al. .......... | 297/180.14 |
| 2004/0104607 | A1 * | 6/2004 | Minegishi et al. .... | 297/180.14 |
| 2005/0200166 | A1 * | 9/2005 | Noh .................... | 297/180.14 |
| 2006/0022495 | A1 * | 2/2006 | Dehli .................. | 297/180.14 |

(Continued)

FOREIGN PATENT DOCUMENTS

| | | |
|---|---|---|
| DE | 102004052076 A1 | 5/2006 |
| FR | 2954208 A1 | 6/2011 |
| WO | 2004/095986 A1 | 11/2004 |

*Primary Examiner* — Rodney B White
(74) *Attorney, Agent, or Firm* — Richard M. Goldberg

(57) ABSTRACT

A seating apparatus includes a suitably shaped housing box (1), a cushion (3) which is associated with it and ventilation (11, 12) and ionization (15) devices disposed inside of the box, capable of projecting ionized air inside the cushion (3).

13 Claims, 2 Drawing Sheets

(56) References Cited

U.S. PATENT DOCUMENTS

| | | |
|---|---|---|
| 2006/0138812 A1* | 6/2006 | Aoki .......................... 297/180.14 |
| 2006/0175877 A1* | 8/2006 | Alionte et al. ............ 297/180.14 |
| 2007/0063552 A1* | 3/2007 | Wang et al. .............. 297/180.11 |
| 2008/0084095 A1 | 4/2008 | Wolas |
| 2008/0182071 A1 | 7/2008 | Cheng |
| 2010/0295339 A1* | 11/2010 | Siu ........................... 297/180.14 |
| 2013/0099529 A1* | 4/2013 | Zheng et al. ............. 297/180.14 |
| 2013/0328359 A1* | 12/2013 | Antonov et al. ......... 297/180.14 |

* cited by examiner

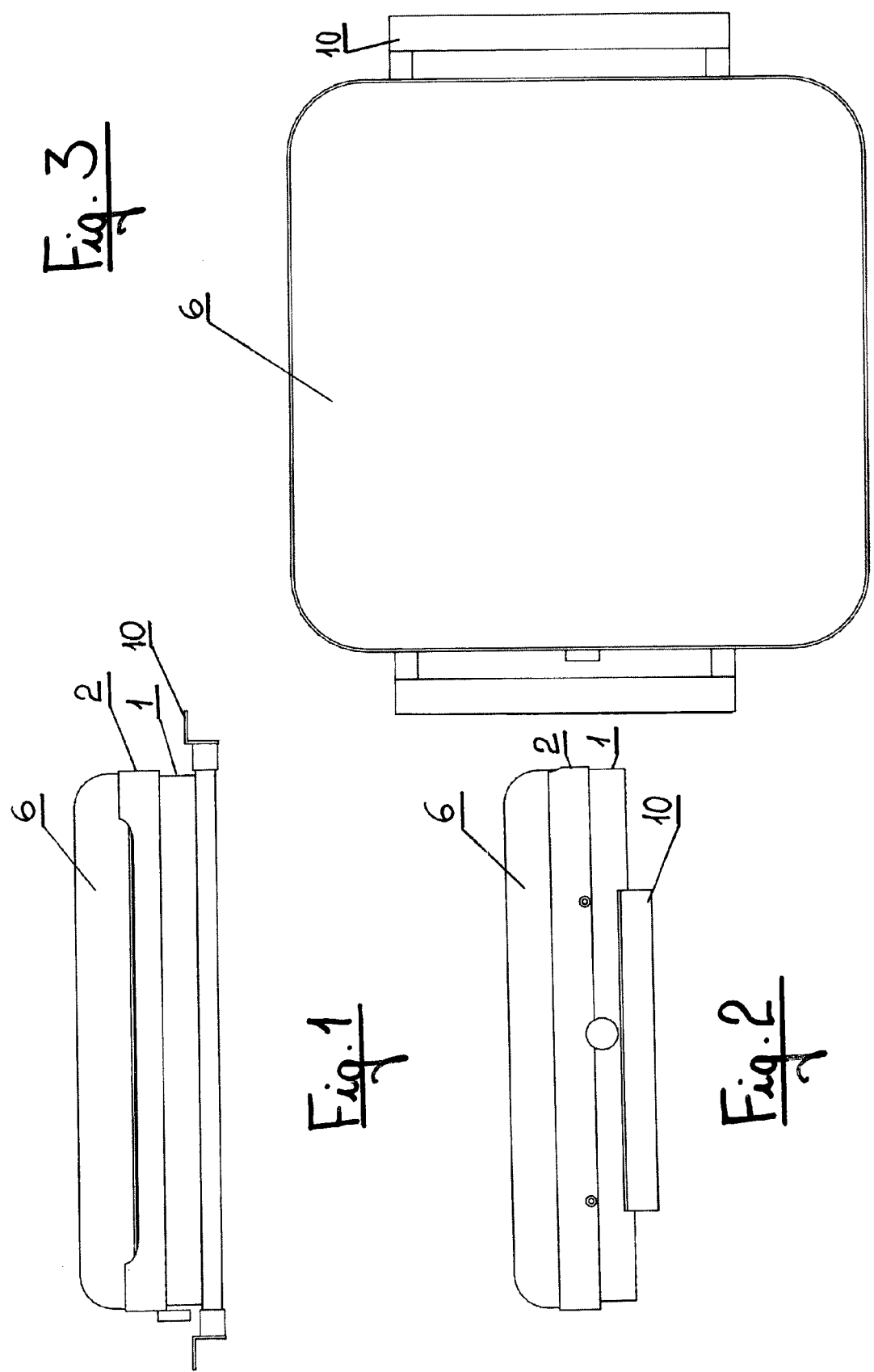

SEATING APPARATUS FOR CHAIRS

BACKGROUND OF THE INVENTION

This invention deals with a seating apparatus for chairs, for instance, wheelchairs destined for invalids.

Concerning the use of the wheelchairs destined to invalids, different types of cushions are already known designed to limit as much as possible the occurrence of bedsores or lesions from long hospitalization. Such cushions are made in a particular conformation with pointed cells, filled with air by means of a manual pump, so as to create a suitable floating support for a subject who must spend a great deal of time in a wheelchair.

However, such cushions present a series of problems for those people who use them since the cells, in the zones of greatest pressure, have a tendency to bend toward the inside limiting the passage of air between the cushion and the parts of the body in contact with the same and, therefore, they bring about the forming of lesions.

Furthermore, the cushion can easily break and, being made up of just one air pocket, may deflate making itself unusable unless suitably repaired.

SUMMARY OF THE INVENTION

This invention proposes a seating cushion that is able to resolve the above mentioned drawbacks and to allow people who are seated to spend a great deal of time in such position with no bothers and, above all, without causing any lesions (for instance, bedsores).

What is more, the cushion can easily be removed and/or moved at any time and for any reason, for instance for maintenance or cleaning.

The subject of this invention is made up of a seating apparatus with circulation of ionized air having the features of the claims.

Said apparatus allows an easy and effective circulation of air between its points of contact and the body of the subject who is seated and, through the production of negative ions, it opposes the onset of infections from pathogenic germs that can multiply themselves in an exponential way when the skin is overheated, moist and compressed.

BRIEF DESCRIPTION OF THE DRAWINGS

The invention is further clarified through illustration of the exemplary solution in the attached drawings, in which:

FIG. 1 illustrates the frontal view of the seating apparatus subject of this invention;

FIG. 2 illustrates the side view of the apparatus of FIG. 1;

FIG. 3 illustrates the view from above of the apparatus of FIG. 1;

DETAILED DESCRIPTION

Figure 4:
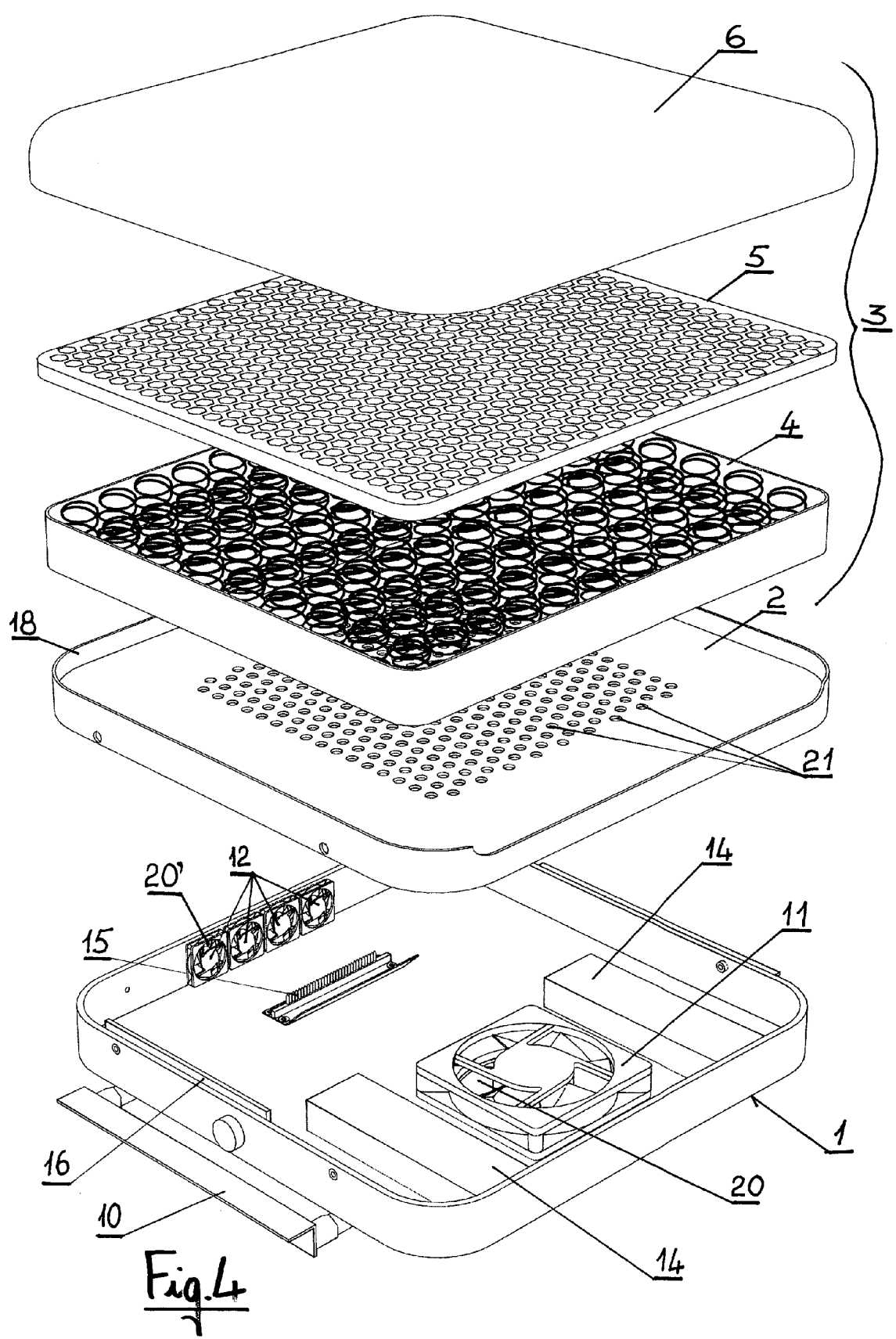
FIG. 4 illustrates the exploded view of the apparatus of FIG. 1.

With reference to the figures mentioned, the apparatus being dealt with is made up of a rigid housing box 1 fitted with top closure 2 with holes 21, destined to the support of a cushion 3, including springs 4, padding 5 and breathable element 6.

The rigid housing box 1 also includes means of support and coupling 10 to the chair.

Furthermore, the cushion 3 is fitted with sensors of pressure, temperature and moisture.

In a preferable solution, the housing box 1 and closure top and support 2 are made from a plastic material (ABS or PVC) and/or other thermo-formable and resistant material.

Inside said housing box, there are the electronic components destined to the production of ionized air: a low-noise primary fan 11 placed at the bottom of said housing 1, secondary fans 12, placed at the back part of said housing box 1, rechargeable battery power 14, one or more ion generators 15, an electronic control card 16 of the on/off state of the system, the rotation speed of the fans, the ion generator and the auxiliary connections and, finally, one or more deflectors of the flow of negative ions with a system to capture positive ions. In the side part of the housing box 1 an on/off switch, a regulator of the intensity of air flow of the fans and a socket for the power supply, for instance, low voltage to recharge the batteries are all envisaged.

In the part below said housing box, the coupling means 10 are envisaged that are adjustable so as to easily adapt to any type of chair.

The bottom of said housing box 1 has a hole 20 for the intake of air from the outside in correspondence with the primary fan 11, while another hole 20' is in correspondence with the secondary fans 12.

As already indicated above, the closure top and support 2 has a hole not only to reduce the weight of the apparatus but also to allow the passage of ionized air produced by the generator with the aid of the fans, which is projected inside the cushion and, therefore, to the base of the seat.

What is more there is conveniently created, on this support 2, an extruded edge 18 turned upward so as to encourage the flow of air, to prevent the entry of liquid substances inside the system and to supply a system of centering for the interior spring cushion.

Said interior spring cushion 3, already in itself known on the market, is fitted with a particular padding 5 able to improve the user's comfort without hampering the flow of air coming from below. For this reason, the use of an open-cell non-woven fabric is envisaged with considerable capacity of breathability, lightness and softness. The external covering is, instead, made with an open-weave fabric with good resistance. A fabric with breathable membrane, for instance "Gore-Tex ®", may also be conveniently used.

In the part below said covering, as described above, pressure, temperature and moisture sensors can be positioned able to allow an automatic regulation of the ventilation system.

Indeed, on the electronic control card 16 the possibility of inserting a speed regulator for the fans is envisaged which can increase or decrease the flow of air produced by the fans themselves.

The electronic card is therefore fitted with input terminals for the signals produced by the pressure, temperature, and moisture sensors, able to manage the starting and stopping of the fans and the ion generator according to the pre-set values.

This results particularly useful in the cases in which the subject that is seated has lost (for instance after having suffered a bone marrow lesion) the sensitivity to touch and temperature, in that the system operates automatically: the system activates when a subject sits on the cushion, the fans and the ion generator work in relation to the pre-set values and it is deactivated when it notices the absence of weight on the cushion (the subject gets up from the seat).

Again it is possible to manage the operation of the fans and the ion generator by means of a remote control with, or without wires.

Additionally or alternatively, the apparatus described herein can also be used for seatback cushions.

What is claimed is:

1. Seating apparatus comprising:
   a shaped housing box,
   a cushion positioned on top of the housing box,
   at least one fan disposed inside of said housing box and immediately below said cushion, and
   at least one ionization device disposed inside of said box, capable of projecting ionized air inside the cushion,
   wherein said housing box includes a lower part with a lower intake hole and a side part with a side intake hole, with said at least one fan, which is disposed inside of said box, sucking air from outside of the housing box and through the lower intake hole and the side intake hole into the housing box and forcing said air through said cushion.

2. Seating apparatus comprising:
   a shaped housing box,
   a cushion positioned on top of the housing box,
   at least one ventilation device disposed inside of said box, and
   at least one ionization device disposed inside of said box, capable of projecting ionized air inside the cushion,
   wherein said housing box includes a lower part with a hole and a side part with an intake hole for communicating with air from outside of the housing box, and
   wherein said housing box comprises an upper part with a closure top fitted with holes for the passage of said ionized air.

3. Seating apparatus comprising:
   a shaped housing box,
   a cushion positioned on top of the housing box,
   at least one ventilation device disposed inside of said box, and
   at least one ionization device disposed inside of said box, capable of projecting ionized air inside the cushion,
   wherein said housing box includes a lower part with a hole and a side part with an intake hole for communicating with air from outside of the housing box, and
   wherein said housing box includes:
      a primary low noise fan inside and on a bottom of said housing box,
      secondary fans placed at a back side part of said housing box,
      a rechargeable battery,
      said at least one ionization device includes at least one ion generator, and
      an electronic card to control an on/off status of the seating apparatus, the rotation speed of the fans and the at least one ion generator.

4. Seating apparatus according to claim 3, further comprising a speed changer for the fans which is adapted to increase and decrease air flow generated by the fans.

5. Seating apparatus according to claim 3, wherein the electronic card automatically controls operation of ventilation fans and the at least one ionization device according to pre-set values.

6. Seating apparatus comprising:
   a shaped housing box,
   a cushion positioned on top of the housing box,
   at least one ventilation device disposed inside of said box, and
   at least one ionization device disposed inside of said box, capable of projecting ionized air inside the cushion,
   wherein said housing box includes a lower part with a hole and a side part with an intake hole for communicating with air from outside of the housing box, and
   at least one flow deflector of negative ions with a system to capture positive ions.

7. Seating apparatus according to claim 1, wherein said housing box includes:
   a rechargeable battery,
   an on/off switch,
   a regulator of the intensity of the air flow and
   an input socket for a low voltage power supply and recharging of the a rechargeable battery.

8. Seating apparatus according to claim 1, wherein said housing box includes, in a lower part thereof, an arrangement for supporting and coupling said housing box to a wheelchair.

9. Seating apparatus comprising:
   a shaped housing box,
   a cushion positioned on top of the housing box,
   at least one ventilation device disposed inside of said box, and
   at least one ionization device disposed inside of said box, capable of projecting ionized air inside the cushion,
   wherein said housing box includes a lower part with a hole and a side part with an intake hole for communicating with air from outside of the housing box, and
   wherein said housing box includes, in a lower part thereof, an extruded edge turned upward for containment of the cushion.

10. Seating apparatus according to claim 1, wherein the cushion is formed of springs, padding and a breathable coating.

11. Seating apparatus according to claim 10, wherein the padding is formed of a non-woven fabric of a breathable material.

12. Seating apparatus according to claim 10, wherein the coating is made from a durable open weave fabric.

13. Seating apparatus comprising:
   a shaped housing box,
   a cushion positioned on top of the housing box,
   at least one ventilation device disposed inside of said box, and
   at least one ionization device disposed inside of said box, capable of projecting ionized air inside the cushion,
   wherein said housing box includes a lower part with a hole and a side part with an intake hole for communicating with air from outside of the housing box, and
   pressure, temperature and moisture sensors adapted to detect parameters of pressure, temperature and moisture inside the cushion.

* * * * *